United States Patent
Howell et al.

(10) Patent No.: US 10,017,914 B1
(45) Date of Patent: Jul. 10, 2018

(54) EXCAVATOR FOUR-BAR LINKAGE LENGTH AND ANGLE OFFSET DETERMINATION USING A LASER DISTANCE METER

(71) Applicant: Caterpillar Trimble Control Technologies LLC, Dayton, OH (US)

(72) Inventors: Mark Nicholas Howell, Christchurch (NZ); Samuel Joseph Frei, Christchurch (NZ)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 35 days.

(21) Appl. No.: 15/385,126

(22) Filed: Dec. 20, 2016

(51) Int. Cl.
| | |
|---|---|
| E02F 3/43 | (2006.01) |
| G05D 1/02 | (2006.01) |
| E02F 3/32 | (2006.01) |
| E02F 9/26 | (2006.01) |
| G01S 17/08 | (2006.01) |

(52) U.S. Cl.
CPC .............. E02F 3/435 (2013.01); E02F 3/32 (2013.01); E02F 3/43 (2013.01); E02F 9/265 (2013.01); G01S 17/08 (2013.01); G05D 1/024 (2013.01); G05D 2201/0202 (2013.01)

(58) Field of Classification Search
CPC .................................... E02F 3/435; E02F 3/32
See application file for complete search history.

(56) References Cited

U.S. PATENT DOCUMENTS

| | | | | |
|---|---|---|---|---|
| 4,393,606 A | * | 7/1983 | Warnecke ............... | E02F 3/435 172/430 |
| 4,829,418 A | * | 5/1989 | Nielsen .................. | E02F 3/435 172/4.5 |
| 6,253,160 B1 | | 6/2001 | Hanseder | |

(Continued)

OTHER PUBLICATIONS

Trimble GCS900 Grade Control System for Excavators, Version 12.60, Revision A, Part Number, Feb. 2014.

*Primary Examiner* — Jess Whittington
(74) *Attorney, Agent, or Firm* — Dinsmore & Shohl, LLP (57) ABSTRACT

An excavator calibration framework comprises an excavator, a laser distance meter (LDM), and a laser reflector. The excavator comprises a chassis, linkage assembly (LA), sensor, implement, and control architecture. The LA comprises a boom, stick, and four-bar linkage (4BL) with the sensor on a 4BL dogbone linkage. The control architecture comprises a controller programmed to execute an iterative process at successive implement curl positions. The iterative process comprises generating a measured dogbone angle $\theta_{DF}^{Measured}$, determining a height $\hat{H}$ and a distance $\hat{D}$ between an implement node and the LDM, and determining an implement node position. The iterative process further comprises determining an estimated implement angle $\theta_{GH}^{Estimated}$ and generating a mapping equation comprising linkage angle inputs ($\theta_{DF}^{Measured}$, $\theta_{GH}^{Estimated}$) and n unsolved 4BL linkage length and angle offset parameters. The controller is programmed to generate and solve a set of m mapping equations comprising the n unsolved parameters.

20 Claims, 4 Drawing Sheets

(56) References Cited

U.S. PATENT DOCUMENTS

| | | | |
|---|---|---|---|
| 6,263,595 B1 | 7/2001 | Ake | |
| 2009/0228169 A1* | 9/2009 | Chiorean | E02F 3/435 |
| | | | 701/29.1 |
| 2015/0330060 A1* | 11/2015 | Seki | E02F 9/264 |
| | | | 701/33.1 |
| 2016/0054114 A1 | 2/2016 | Crozier et al. | |
| 2016/0251834 A1* | 9/2016 | Arimatsu | E02F 3/435 |
| | | | 414/687 |

* cited by examiner

EXCAVATOR FOUR-BAR LINKAGE LENGTH AND ANGLE OFFSET DETERMINATION USING A LASER DISTANCE METER

BACKGROUND

The present disclosure relates to excavators which, for the purposes of defining and describing the scope of the present application, comprise an excavator boom and an excavator stick subject to swing and curl, and an excavating implement that is subject to swing and curl control with the aid of the excavator boom and excavator stick, or other similar components for executing swing and curl movement. For example, and not by way of limitation, many types of excavators comprise a hydraulically or pneumatically or electrically controlled excavating implement that can be manipulated by controlling the swing and curl functions of an excavating linkage assembly of the excavator. Excavator technology is, for example, well represented by the disclosures of U.S. Pat. No. 8,689,471, which is assigned to Caterpillar Trimble Control Technologies LLC and discloses methodology for sensor-based automatic control of an excavator, US 2008/0047170, which is assigned to Caterpillar Trimble Control Technologies LLC and discloses an excavator 3D laser system and radio positioning guidance system configured to guide a cutting edge of an excavator bucket with high vertical accuracy, and US 2008/0000111, which is assigned to Caterpillar Trimble Control Technologies LLC and discloses methodology for an excavator control system to determine an orientation of an excavator sitting on a sloped site.

BRIEF SUMMARY

According to the subject matter of the present disclosure, an excavator calibration framework comprises an excavator, a laser distance meter (LDM), and a laser reflector. The excavator comprises a machine chassis, an excavating linkage assembly, an implement dynamic sensor, an excavating implement, and control architecture. The excavating linkage assembly comprises an excavator boom, an excavator stick, and a four-bar linkage. The excavating implement and the excavator stick are mechanically coupled through the four-bar linkage comprising an implement linkage of length GH, a rear side linkage of length FH, a dogbone linkage of length DF, and a front side linkage of length DG. The implement dynamic sensor is positioned on the dogbone linkage of the four-bar linkage. The excavating implement is configured to curl relative to the excavator stick to define a plurality of implement curl positions. The LDM is configured to generate an LDM distance signal $D_{LDM}$ indicative of a distance between the LDM and the laser reflector and an angle of inclination signal $\theta_{INC}$ indicative of an angle between the LDM and the laser reflector. The laser reflector is configured to be disposed at a position corresponding to a calibration node on the excavating implement. The control architecture comprises one or more linkage assembly actuators and an architecture controller programmed to execute an iterative process at successive implement curl positions. The iterative process comprises generating a measured dogbone angle $\theta_{DF}^{Measured}$ of the dogbone linkage from the implement dynamic sensor, determining a height $\hat{H}$ and a distance $\hat{D}$ between the calibration node on the excavating implement and the LDM based on the LDM distance signal $D_{LDM}$ and the angle of inclination signal $\theta_{INC}$, and determining a position of the calibration node at least partially based on the height $\hat{H}$ and the distance $\hat{D}$. The iterative process further comprises determining an estimated implement angle $\theta_{GH}^{Estimated}$ of the excavating implement at least partially based on the position of the calibration node, and generating a mapping equation comprising linkage angle inputs, unsolved linkage length parameters, and unsolved angle offset parameters. The linkage angle inputs comprise the measured dogbone angle $\theta_{DF}^{Measured}$ and the estimated implement angle $\theta_{GH}^{Estimated}$ the implement curl position. The unsolved linkage length parameters comprise the linkage lengths GH, FH, DF, and DG of the four-bar linkage. The unsolved angle offset parameters comprise an offset dogbone angle $\theta_{DF}^{Bias}$ of the dogbone linkage, and an offset implement angle $\theta_{GH}^{Bias}$ of the excavating implement. The architecture controller is further programmed to repeat the iterative process for successive implement curl positions to generate a set of m mapping equations, wherein the set of m mapping equations comprises n unsolved linkage length and unsolved angle offset parameters, and the iterative process is repeated until m>n. The architecture controller is further programmed to solve the generated set of m mapping equations comprising the n unsolved parameters to determine the linkage lengths GH, FH, DF, and DG of the four-bar linkage, the offset dogbone angle $\theta_{DF}^{Bias}$ of the dogbone linkage, and the offset implement angle $\theta_{GH}^{Bias}$ of the excavating implement, and operate the excavator using the linkage lengths GH, FH, DF, and DG, the offset dogbone angle $\theta_{DF}^{Bias}$, and the offset implement angle $\theta_{GH}^{Bias}$.

Figure 1:
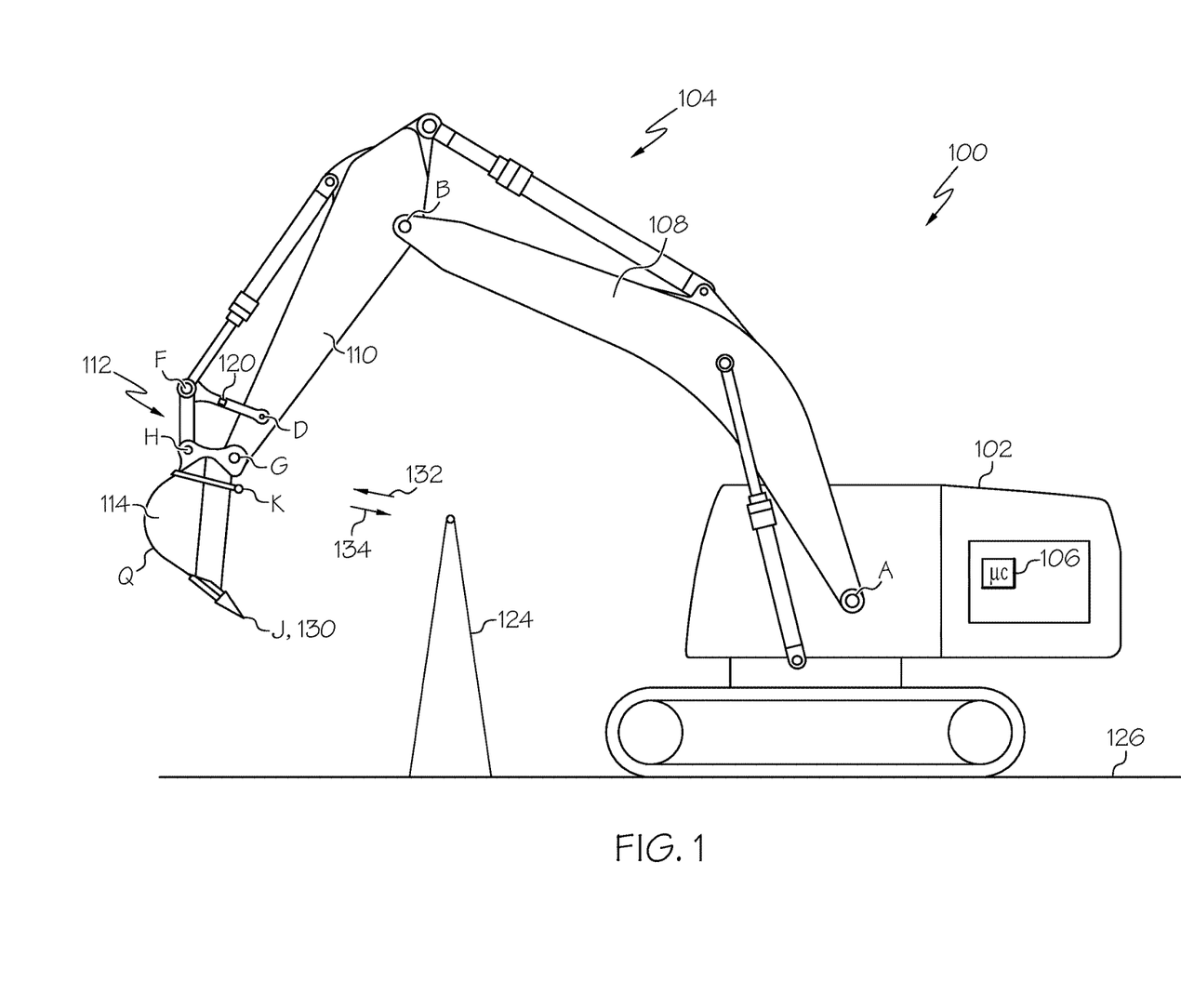
FIG. 1 is a side view of an excavator incorporating aspects of the present disclosure.

Although the concepts of the present disclosure are described herein with primary reference to the excavator illustrated in FIG. 1, it is contemplated that the concepts will enjoy applicability to any type of excavator, regardless of its particular mechanical configuration. For example, and not by way of limitation, the concepts may enjoy applicability to a backhoe loader including a backhoe linkage.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

The present disclosure relates to earthmoving machines and, more particularly, to earthmoving machines such as excavators including components subject to control. For example, and not by way of limitation, many types of excavators typically have a hydraulically controlled earthmoving implement that can be manipulated by a joystick or other means in an operator control station of the machine, and is also subject to partially or fully automated control. The user of the machine may control the lift, tilt, angle, and pitch of the implement. In addition, one or more of these variables may also be subject to partially or fully automated control based on information sensed or received by an adaptive environmental sensor of the machine. In the embodiments described herein, an excavator calibration framework utilizes a laser distance meter to determine four-bar linkage lengths of excavator limb components and related angle offsets, such as an angle offset of one or more sensors disposed on those respective linkages, as described in greater detail further below. Such determined values may be utilized by an excavator control to operate the excavator.

Referring initially to FIG. 1, an excavator calibration framework comprises an excavator 100, a laser distance meter (LDM) 124, and a laser reflector 130. The excavator 100 comprises a machine chassis 102, an excavating linkage assembly 104, an implement dynamic sensor 120, an excavating implement 114, and control architecture 106. The excavating linkage assembly 104 comprises an excavator boom 108, an excavator stick 110, and a four-bar linkage 112. The excavating implement 114 and the excavator stick 110 are mechanically coupled through the four-bar linkage 112. In embodiments, the laser reflector 130 is on a pole or secured directly to the excavating implement 114. The LDM 124 may be, for example, a Bosch GLM 100C LDM as made commercially available by Robert Bosch GmbH of Germany. A laser signal from the LDM 124, which is placed on ground 126, may be transmitted in a direction of an arrow 132 to the calibration node and an aligned laser reflector, such as, for example, the laser reflector 130, and the laser signal may be reflected back to the LDM 124 in the direction of an arrow 134, as illustrated in FIG. 1.

Figure 2:
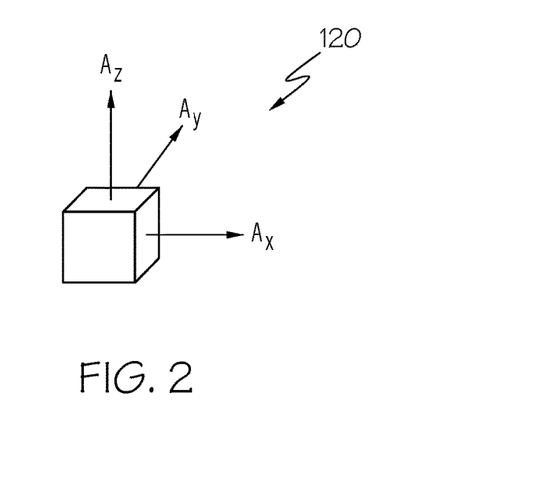
FIG. 2 is a perspective view of a dynamic sensor disposed on a linkage of the excavator of FIG. 1 and according to various concepts of the present disclosure.

In embodiments, the implement dynamic sensor 120 comprises an inertial measurement unit (IMU), an inclinometer, an accelerometer, a gyroscope, an angular rate sensor, a rotary position sensor, a position sensing cylinder, or combinations thereof. The IMU may include a 3-axis accelerometer and a 3-axis gyroscope. As shown in FIG. 2, the implement dynamic sensor 120 includes accelerations $A_x$, $A_y$, and $A_z$, respectively representing x-axis, y-axis-, and z-axis acceleration values.

Figure 5:
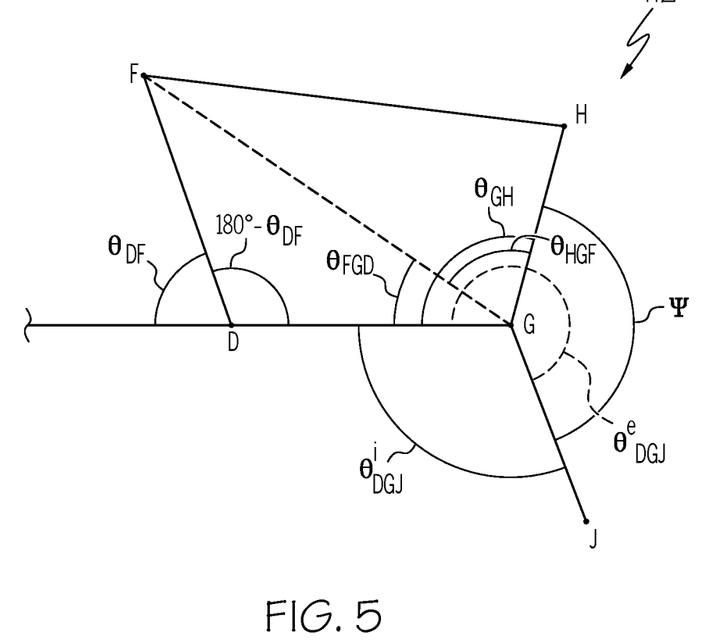
FIG. 5 is another side elevation view of the four-bar linkage assembly of FIG. 4, according to various concepts of the present disclosure.

The four-bar linkage 112 comprises an implement linkage of length GH, a rear side linkage of length FH, a dogbone linkage of length DF, and a front side linkage of length DG. The implement dynamic sensor 120 is positioned on the dogbone linkage of length DF of the four-bar linkage 112. In embodiments, the four-bar linkage comprises a node D, a node F, a node G, a node H. As a non-limiting example, the implement linkage is disposed between respective positions corresponding to the node G and the node H. The rear side linkage is disposed between respective positions corresponding to the node F and the node H. The dogbone linkage is disposed between respective positions corresponding to the node D and the node F, and front side linkage is disposed between respective positions corresponding to the node D and the node G. Further, the node G of the four-bar linkage 112 may be disposed at a position corresponding to the terminal point of the excavator stick 110 through which the excavator stick 110 is coupled to the excavating implement 114. Referring to FIG. 5, the four-bar linkage 112 comprises a diagonal length FG between a front end node of the implement linkage of length GH and a rear end node of the dogbone linkage of length DF.

The excavating implement 114 is configured to curl relative to the excavator stick 110 to define a plurality of implement curl positions. In embodiments, the excavating linkage assembly 104 may be configured to swing with, or relative to, the machine chassis 102, and the excavator stick 110 may be configured to curl relative to the excavator boom 108. Further, the machine chassis 102 may be mechanically coupled to a terminal pivot point A of the excavator boom 108. The excavator stick 110 may comprise a stick terminal point corresponding to the position of the node G of the four-bar linkage 112 and may be mechanically coupled to a terminal pivot point B of the excavator boom 108. Further, the excavator stick 110 may be mechanically coupled to the excavating implement 114 through the stick terminal point. A position of the terminal pivot point B and the node G may be identified prior to, for example, the iterative process being executed by the architecture controller.

Figure 3:
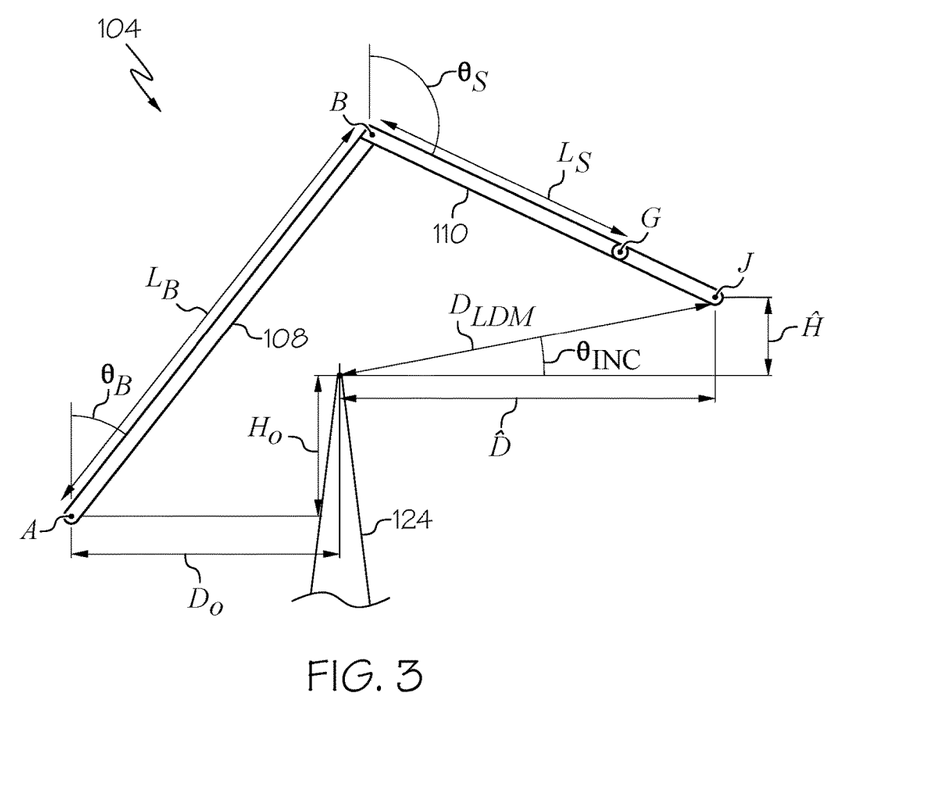
FIG. 3 is a side elevation view of a linkage assembly of an excavator calibration framework including a laser distance meter (LDM) and implement dimension points of an excavating implement of the excavator of FIG. 1.

Referring to FIG. 3, a boom limb length $L_B$ is a limb length of the excavator boom 108, a boom angle $\theta_B$ is an angle of the excavator boom 108 between the terminal pivot points A and B relative to gravity, a stick limb length $L_S$ is a limb length of the excavator stick 110, and a stick angle $\theta_S$ is an angle of the excavator stick 110 between the terminal pivot point B and the node G relative to gravity. One or more dynamic sensors may be disposed on excavator components such as the limbs of the excavator boom 108 or the excavator stick 110 or on any of the linkages of the four-bar linkage 112.

The LDM 124 is configured to generate an LDM distance signal $D_{LDM}$ indicative of a distance between the LDM 124 and the laser reflector 139 and an angle of inclination signal $\theta_{INC}$ indicative of an angle between the LDM 124 and the laser reflector 130. The laser reflector 130 is configured to be disposed at a position corresponding to a calibration node on the excavating implement 114. In embodiments, the calibration node is positioned at a terminal point J at a bucket tooth tip of the excavating implement 114. A height $H_0$ of the LDM 124 from the terminal pivot point A of the excavator boom 108 and a distance $D_0$ of the LDM from a terminal pivot point A of the excavator boom may be identified or determined prior to, for example, the iterative process being executed by the architecture controller.

The control architecture 106 comprises one or more linkage assembly actuators and an architecture controller programmed to execute an iterative process at successive implement curl positions. In embodiments, the control architecture comprises a non-transitory computer-readable storage medium comprising machine readable instructions that the architecture controller is programmed to execute. The one or more linkage assembly actuators may facilitate movement of the excavating linkage assembly 104. Further, the one or more linkage assembly actuators may comprise a hydraulic cylinder actuator, a pneumatic cylinder actuator, an electrical actuator, a mechanical actuator, or combinations thereof.

Figure 6:
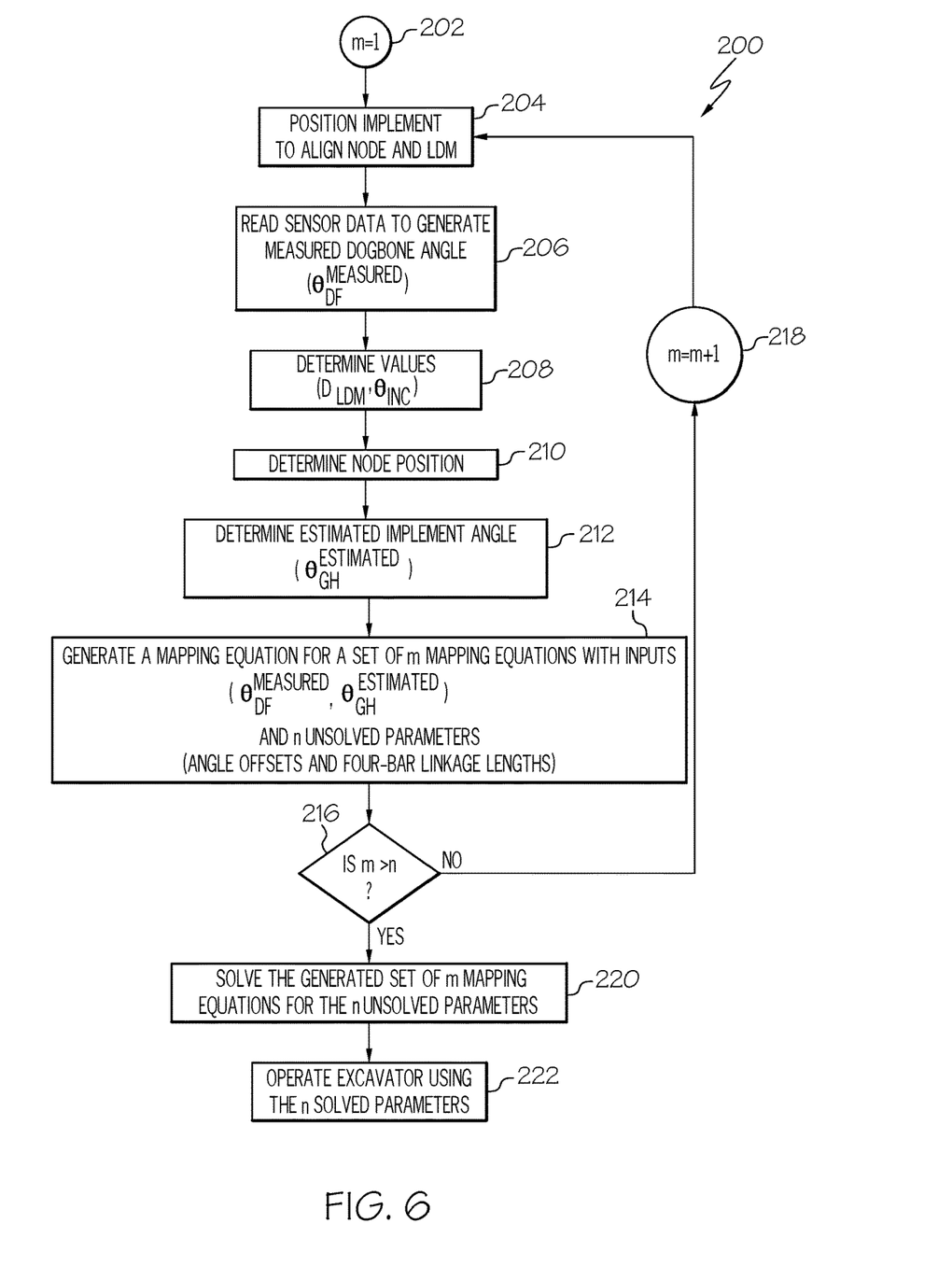
FIG. 6 is a flow chart of a process used to determine four-bar linkage dimensions and angle offsets of the excavator of FIG. 1.

The iterative process is illustrated in FIG. 6 through a control scheme 200 and steps 202-218. In step 202, the iterative process may start with a first iteration in which m=1. The calibration node may be aligned through the excavating linkage assembly 104 to align with the LDM 124 in step 204. The iterative process comprises generating a measured dogbone angle $\theta_{DF}^{Measured}$ of the dogbone linkage from the implement dynamic sensor 120, as illustrated in step 206. The iterative process further comprises determining a height $\hat{H}$ and a distance $\hat{D}$ between the calibration node on the excavating implement 114 and the LDM 124 based on the LDM distance signal $D_{LDM}$ and the angle of inclination signal $\theta_{INC}$, as illustrated in step 208. As shown in step 210, the iterative process comprising determining a position of the calibration node at least partially based on the height $\hat{H}$ and the distance $\hat{D}$. Additionally, the iterative process comprises, as shown in step 212, determining an estimated implement angle $\theta_{GH}^{Estimated}$ of the excavating implement 114 at least partially based on the position of the calibration node.

Figure 4:
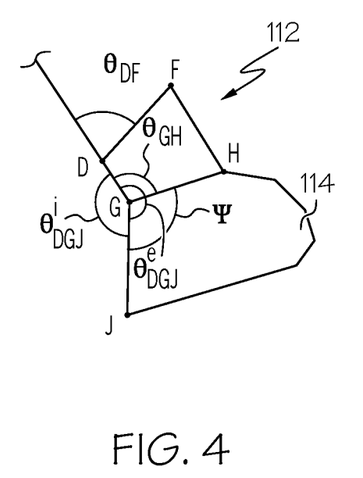
FIG. 4 is a side elevation view of a four-bar linkage assembly of the excavator of FIG. 1, according to various concepts of the present disclosure.

In embodiments, the estimated implement angle $\theta_{GH}^{Estimated}$ of the excavating implement 114 may be determined at least partially based on the position of the node G and the position of the terminal pivot point B. Additionally or alternatively, the estimated implement angle $\theta_{GH}^{Estimated}$ of the excavating implement is determined at least partially based on a lookup table estimating the based on the measured dogbone angle $\theta_{DF}^{Measured}$. In another embodiment, a position of the node D of the four-bar linkage 112 is determined based on the measured dogbone angle $\theta_{DF}^{Measured}$, or may be otherwise identified, and the estimated implement angle $\theta_{GH}^{Estimated}$ of the excavating implement is determined at least partially based on the position of the node D and the position of the terminal pivot point B. As a non-limiting example, the estimated implement angle $\theta_{GH}^{Estimated}$ of the excavating implement is determined at least partially based on a determined internal angle $\theta_{DGJ}^{i}$ that based on the positions of nodes D and G and the terminal point J. Referring to FIGS. 4-5, a determined external angle $\theta_{DGJ}^{e}$ may be determined based on the determined internal angle $\theta_{DGJ}^{i}$ per a following equation:

$$\theta_{DGJ}^{e} = 360° - \theta_{DGJ}^{i} \quad \text{(Equation 1)}$$

Further, the determined external angle $\theta_{DGJ}^{e}$ is a sum of the estimated implement angle $\theta_{GH}^{Estimated}$ of the excavating implement and a implement angle $\Psi$ that is a constant angle formed between surfaces of the excavating implement 114 disposed between the terminal point J and the nodes G and H, such that:

$$\theta_{DGJ}^{e} = \theta_{GH}^{Estimated} + \Psi \quad \text{(Equation 2)}$$

which is rearranged into a following equation:

$$\theta_{HG}^{Estimated} = \theta_{DGJ}^{e} - \Psi \quad \text{(Equation 3)}$$

The iterative process further comprises, as shown in step 214 of FIG. 6, generating a mapping equation comprising linkage angle inputs, unsolved linkage length parameters, and unsolved angle offset parameters. The linkage angle inputs comprise the measured dogbone angle $\theta_{DF}^{Measured}$ and the estimated implement angle $\theta_{GH}^{Estimated}$ at the implement curl position. The unsolved linkage length parameters comprise the linkage lengths GH, FH, DF, and DG of the four-bar linkage. The unsolved angle offset parameters comprise an offset dogbone angle $\theta_{DF}^{Bias}$ of the dogbone linkage, and an offset implement angle $\theta_{GH}^{Bias}$ of the excavating implement 114.

In embodiments, the mapping equation comprises a following equation, which includes an actual dogbone angle $\theta_{DF}^{Actual}$ and an actual implement angle $\theta_{GH}^{Actual}$:

$$\theta_{GH}^{Actual} = \frac{DG - DF * \cos(180° - \theta_{DF}^{Actual})}{FG} + \quad \text{(Equation 4)}$$

-continued
$$\frac{DF^2 + DG^2 + GH^2 - 2*DF*DG*\cos(180° - \theta_{DF}^{Actual}) - FH^2}{2*FG*GH}$$

The actual dogbone angle $\theta_{GH}^{Actual}$ is based on the measured dogbone angle $\theta_{GH}^{Estimated}$ and the offset dogbone angle $\theta_{GH}^{Bias}$ such that:

$$\theta_{DF}^{Actual} = \theta_{DF}^{Measured} - \theta_{DF}^{Bias} \quad \text{(Equation 5)}$$

the actual implement angle $\theta_{GH}^{Actual}$ al is based on the estimated implement angle $\theta_{GH}^{Estimated}$ and the offset implement angle $\theta_{GH}^{Bias}$ such that:

$$\theta_{GH}^{Actual} = \theta_{GH}^{Estimated} - \theta_{GH}^{Bias} \quad \text{(Equation 6)}$$

Further, the mapping equation is based on an implement angle equation, as follows:

$$\theta_{GH}^{Actual} = \frac{DG^2 + FG^2 - DF^2}{2*FG*DG} + \frac{FG^2 + GH^2 - FH^2}{2*FG*GH} \quad \text{(Equation 7)}$$

The implement angle equation is based on an implement angle summation equation, as follows:

$$\theta_{GH}^{Actual} = \theta_{FGD} + \theta_{HGF} \quad \text{(Equation 8)}$$

In Equation 8, $\theta_{HGF}$ is an angle between nodes H, G, and F, and $\theta_{FGD}$ is an angle between nodes F, G, and D. Further, $\theta_{HGF}$ and $\theta_{FGD}$ are based on a following pair of equations:

$$\theta_{FGD} = \frac{DG^2 + FG^2 - DF^2}{2*FG*DG} \text{ and} \quad \text{(Equations 9-10)}$$
$$\theta_{HGF} = \frac{FG^2 + GH^2 - FH^2}{2*FG*GH}$$

The mapping equation is further based on a substitution of a $FG^2$ term in the implement angle equation with a diagonal length squared equation, which follows:

$$FG^2 = DF^2 + DG^2 - 2*DF*DG*\cos(180° - \theta_{DF}^{Actual}) \quad \text{(Equation 11)}$$

Further, the diagonal length squared equation of Equation 11 is based on a diagonal length equation, as follows:

$$FG = \sqrt{DF^2 + DG^2 - 2*DF*DG*\cos(180° - \theta_{DF}^{Actual})} \quad \text{(Equation 12)}$$

In embodiments, the mapping equation maps a waveform as, for example, a graphical empirical chart or display, the waveform comprising linear and non-linear regions at least partially based on one or more linkage lengths.

The architecture controller is further programmed to repeat the iterative process for successive implement curl positions to generate a set of m mapping equations, wherein the set of m mapping equations comprises n unsolved linkage length and unsolved angle offset parameters, and the iterative process is repeated until m>n. For example, as shown in step 216 of FIG. 6, if m>n is not true, then the iterative process continues to step 218 and the next iteration of m to repeat through steps 204-216. If, in step 216, m>n is true, the control scheme 200 continues on to step 220. In embodiments, the iterative process is repeated until m passes a threshold greater than n. As a non-limiting example, n may be equal to 6 and the threshold may be 17 such that m is equal to 18 to generate a set of 18 mapping equations comprising 6 unsolved linkage length and unsolved angle offset parameters.

As shown in step 220 of FIG. 6, the architecture controller is further programmed to solve the generated set of m mapping equations comprising the n unsolved parameters to determine the linkage lengths GH, FH, DF, and DG of the four-bar linkage, the offset dogbone angle $\theta_{DF}^{Bias}$ of the dogbone linkage, and the offset implement angle $\theta_{GH}^{Bias}$ of the excavating implement 114. Further, as shown in step 222 of FIG. 6, the architecture controller is programmed to operate the excavator 100 using the n solved parameters of linkage lengths GH, FH, DF, and DG, the offset dogbone angle $\theta_{DF}^{Bias}$, and the offset implement angle $\theta_{GH}^{Bias}$.

It is contemplated that the embodiments of the present disclosure may assist to permit a speedy and more cost efficient method of determining linkage lengths, sensor offsets of sensors on excavator linkages, and offsets of angular estimations of excavator linkages in a manner that minimizes a risk of human error with such value determinations. Further, the controller of the excavator or other control technologies are improved such that the processing systems are improved and optimized with respect to speed, efficiency, and output.

A signal may be "generated" by direct or indirect calculation or measurement, with or without the aid of a sensor.

For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. An excavator calibration framework comprising an excavator, a laser distance meter (LDM), and a laser reflector, wherein:
the excavator comprises a machine chassis, an excavating linkage assembly, an implement dynamic sensor, an excavating implement, and control architecture;
the excavating linkage assembly comprises an excavator boom, an excavator stick, and a four-bar linkage;
the excavating implement and the excavator stick are mechanically coupled through the four-bar linkage comprising an implement linkage of length GH, a rear side linkage of length FH, a dogbone linkage of length DF, and a front side linkage of length DG;
the implement dynamic sensor is positioned on the dogbone linkage of the four-bar linkage;
the excavating implement is configured to curl relative to the excavator stick to define a plurality of implement curl positions;
the LDM is configured to generate an LDM distance signal $D_{LDM}$ indicative of a distance between the LDM and the laser reflector and an angle of inclination signal $\theta_{INC}$ indicative of an angle between the LDM and the laser reflector;
the laser reflector is configured to be disposed at a position corresponding to a calibration node on the excavating implement;
the control architecture comprises one or more linkage assembly actuators and an architecture controller programmed to execute an iterative process at successive implement curl positions, the iterative process comprising
generating a measured dogbone angle $\theta_{DF}^{Measured}$ of the dogbone linkage from the implement dynamic sensor,
determining a height $\hat{H}$ and a distance $\hat{D}$ between the calibration node on the excavating implement and the LDM based on the LDM distance signal $D_{LDM}$ and the angle of inclination signal $\theta_{INC}$,
determining a position of the calibration node at least partially based on the height $\hat{H}$ and the distance $\hat{D}$,
determining an estimated implement angle $\theta_{GH}^{Estimated}$ of the excavating implement at least partially based on the position of the calibration node, and
generating a mapping equation comprising linkage angle inputs, unsolved linkage length parameters, and unsolved angle offset parameters, wherein the linkage angle inputs comprise the measured dogbone angle $\theta_{DF}^{Measured}$ and the estimated implement angle $\theta_{GH}^{Estimated}$ the implement curl position, the unsolved linkage length parameters comprise the linkage lengths GH, FH, DF, and DG of the four-bar linkage, and the unsolved angle offset parameters comprise an offset dogbone angle $\theta_{DF}^{Bias}$ of the dogbone linkage, and an offset implement angle $\theta_{GH}^{Bias}$ of the excavating implement; and the architecture controller is further programmed to
  repeat the iterative process for successive implement curl positions to generate a set of m mapping equations, wherein the set of m mapping equations comprises n unsolved linkage length and unsolved angle offset parameters, and the iterative process is repeated until m>n,
  solve the generated set of m mapping equations comprising the n unsolved parameters to determine the linkage lengths GH, FH, DF, and DG of the four-bar linkage, the offset dogbone angle $\theta_{DF}^{Bias}$ of the dogbone linkage, and the offset implement angle $\theta_{GH}^{Bias}$ of the excavating implement, and
  operate the excavator using the linkage lengths GH, FH, DF, and DG, the offset dogbone angle $\theta_{DF}^{Bias}$, and the offset implement angle $\theta_{GH}^{Bias}$.

2. An excavator calibration framework as claimed in claim 1, wherein:
the four-bar linkage comprises a node D, a node F, a node G, a node H;
the implement linkage is disposed between respective positions corresponding to the node G and the node H;
the rear side linkage is disposed between respective positions corresponding to the node F and the node H;
the dogbone linkage is disposed between respective positions corresponding to the node D and the node F; and
the front side linkage is disposed between respective positions corresponding to the node D and the node G.

3. An excavator calibration framework as claimed in claim 2, wherein the node G of the four-bar linkage is disposed at a position corresponding to a terminal point of the excavator stick through which the excavator stick is coupled to the excavating implement.

4. An excavator calibration framework as claimed in claim 1, wherein the iterative process is repeated until m passes a threshold greater than n.

5. An excavator calibration framework as claimed in claim 4, wherein n is equal to 6 and the threshold is 17 such that m is equal to 18 to generate a set of 18 mapping equations comprising 6 unsolved linkage length and unsolved angle offset parameters.

6. An excavator calibration framework as claimed in claim 1, wherein the laser reflector is on a pole or secured directly to the excavating implement.

7. An excavator calibration framework as claimed in claim 1, wherein the calibration node is positioned at a terminal point J at a bucket tooth tip of the excavating implement.

8. An excavator calibration framework as claimed in claim 1, wherein the machine chassis is mechanically coupled to a terminal pivot point A of the excavator boom.

9. An excavator calibration framework as claimed in claim 1, wherein the excavator stick comprises a stick terminal point corresponding to the position of a node G of the four-bar linkage and is mechanically coupled to a terminal pivot point B of the excavator boom; and
the excavator stick is mechanically coupled to the excavating implement through the stick terminal point.

10. An excavator calibration framework as claimed in claim 9, wherein a position of the terminal pivot point B and the node G are identified.

11. An excavator calibration framework as claimed in claim 10, wherein the estimated implement angle $\theta_{GH}^{Estimated}$ of the excavating implement is determined at least partially based on the position of the node G and the position of the terminal pivot point B.

12. An excavator calibration framework as claimed in claim 9, wherein:
the four-bar linkage comprises a node D, a node F, a node G, a node H;
the calibration node is positioned at a terminal point J at a heading tooth tip of the excavating implement;
a position of the terminal pivot point B is identified;
a position of the node D of the four-bar linkage is determined based on the measured dogbone angle $\theta_{DF}^{Measured}$; and
the estimated implement angle $\theta_{GH}^{Estimated}$ of the excavating implement is determined at least partially based on the position of the node D and the position of the terminal pivot point B.

13. An excavator calibration framework as claimed in claim 12, wherein the estimated implement angle $\theta_{GH}^{Estimated}$ of the excavating implement is determined at least partially based on:
a determined internal angle $\theta_{DGJ}^{i}$ based on the positions of nodes D and G and the terminal point J such that a determined external angle $\theta_{DGJ}^{e}=360°-\theta_{DGJ}^{i}$.

14. An excavator calibration framework as claimed in claim 13, wherein the determined external angle $\theta_{DGJ}^{e}$ is a sum of the estimated implement angle $\theta_{GH}^{Estimated}$ of the excavating implement and a implement angle $\Psi$ that is a constant angle formed between the surfaces of the excavating implement disposed between the terminal point J and the nodes G and H, such that:

$$\theta_{GH}^{Estimated}=\theta_{DGJ}^{e}-\Psi.$$

15. An excavator calibration framework as claimed in claim 1, wherein:
the four-bar linkage comprises a diagonal length FG between a front end node of the implement linkage of length GH and a rear end node of the dogbone linkage of length DF; and
the mapping equation comprises a following equation, including an actual dogbone angle $\theta_{DF}^{Actual}$ and an actual implement angle $\theta_{GH}^{Actual}$:

$$\theta_{GH}^{Actual} = \frac{DG - DF * \cos(180° - \theta_{DF}^{Actual})}{FG} + \frac{DF^2 + DG^2 + GH^2 - 2*DF* DG*\cos(180° - \theta_{DF}^{Actual}) - FH^2}{2*FG*GH}.$$

16. An excavator calibration framework as claimed in claim 15, wherein the actual dogbone angle $\theta_{DF}^{Actual}$ based on the measured dogbone angle $\theta_{DF}^{Measured}$ and the offset dogbone angle $\theta_{DF}^{Bias}$ such that:

$$\theta_{DF}^{Actual}=\theta_{DF}^{Measured}-\theta_{DF}^{Bias}.$$

17. An excavator calibration framework as claimed in claim 15, wherein the actual implement angle $\theta_{GH}^{Actual}$ is based on the estimated implement angle $\theta_{GH}^{Estimated}$ and the offset implement angle $\theta_{GH}^{Bias}$ such that:

$$\theta_{GH}^{Actual}=\theta_{GH}^{Estimated}-\theta_{GH}^{Bias}.$$

18. An excavator calibration framework as claimed in claim 15, wherein the mapping equation is based on an implement angle equation, as follows:

$$\theta_{GH}^{Actual} = \frac{DG^2 + FG^2 - DF^2}{2*FG*DG} + \frac{FG^2 + GH^2 - FH^2}{2*FG*GH}$$

and a substitution of a $FG^2$ term in the implement angle equation with a diagonal length squared equation, as follows:

$$FG^2 = \sqrt{DF^2 + DG^2 - 2*DF*DG*\cos(180° - \theta_{DF}^{Actual})}.$$

19. An excavator calibration framework as claimed in claim 18, wherein the diagonal length squared equation is based on a diagonal length equation, as follows:

$$FG = \sqrt{DF^2 + DG^2 - 2*DF*DG*\cos(180° - \theta_{DF}^{Actual})}.$$

20. An excavator calibration framework as claimed in claim 18, wherein the implement angle equation is based on an implement angle summation equation, as follows:

$$\theta_{GH}^{Actual} = \theta_{FGD} + \theta_{HGF}.$$

\* \* \* \* \*

UNITED STATES PATENT AND TRADEMARK OFFICE
CERTIFICATE OF CORRECTION

PATENT NO. : 10,017,914 B1
APPLICATION NO. : 15/385126
DATED : July 10, 2018
INVENTOR(S) : Mark Nicholas Howell and Samuel Joseph Frei It is certified that error appears in the above-identified patent and that said Letters Patent is hereby corrected as shown below:

In the Specification

Column 3, Line 46:
"Ay, and Az, respectively representing x-axis, y-axis-, and"
Should read:
--Ay, and Az, respectively representing x-axis, y-axis, and--; and Column 4, Line 39:
"tip of the excavating implement 114. A height HO of the"
Should read:
--tip of the excavating implement 114. A height H0 of the--; and Column 4, Line 41:
"boom 108 and a distance DO of the LDM from a terminal"
Should read:
--boom 108 and a distance D0 of the LDM from a terminal--; and Column 5, Line 17:
"based on a lookup table estimating the based on the mea-"
Should read:
--based on a lookup table estimating based on the mea- --; and Column 5, Line 47:
"θHGEstimated=θDGJe-ψ"
Should read:
--θGHEstimated=θDGJe-ψ--; and Column 6, Line 7:
"The actual dogbone angle θGHActual is based on the"
Should read:

Signed and Sealed this
Thirteenth Day of November, 2018

Andrei Iancu
*Director of the United States Patent and Trademark Office*

CERTIFICATE OF CORRECTION (continued)
U.S. Pat. No. 10,017,914 B1

--The actual dogbone angle θDFActual is based on the--; and

Column 6, Line 8:
"measured dogbone angle θGHEstimated and the offset dogbone"
Should read:
--measured dogbone angle θDFEstimated and the offset dogbone--; and Column 6, Line 9:
"angle θGHBias such that:"
Should read:
--angle θDFBias such that:--; and Column 6, Line 12:
"the actual implement angle θGHActual al is based on the"
Should read:
--the actual implement angle θGHActual is based on the--; and In the Claims Column 9, Line 3, Claim 1:
"θGHEstimated the implement curl position, the"
Should read:
--θGHEstimated at the implement curl position, the--; and Column 11, Line 13, Claim 18:
"FG2= √DF2+DG2-2*DF*DG*cos(180°-θDFActual)."
Should read:
--FG2= DF2+DG2-2*DF*DG*cos(180°-θDFActual).--.